Feb. 26, 1952 W. T. GAFFORD 2,587,135
PROTECTOR ATTACHMENT FOR SODA FOUNTAIN MIXERS
Filed Dec. 21, 1950 2 SHEETS—SHEET 1
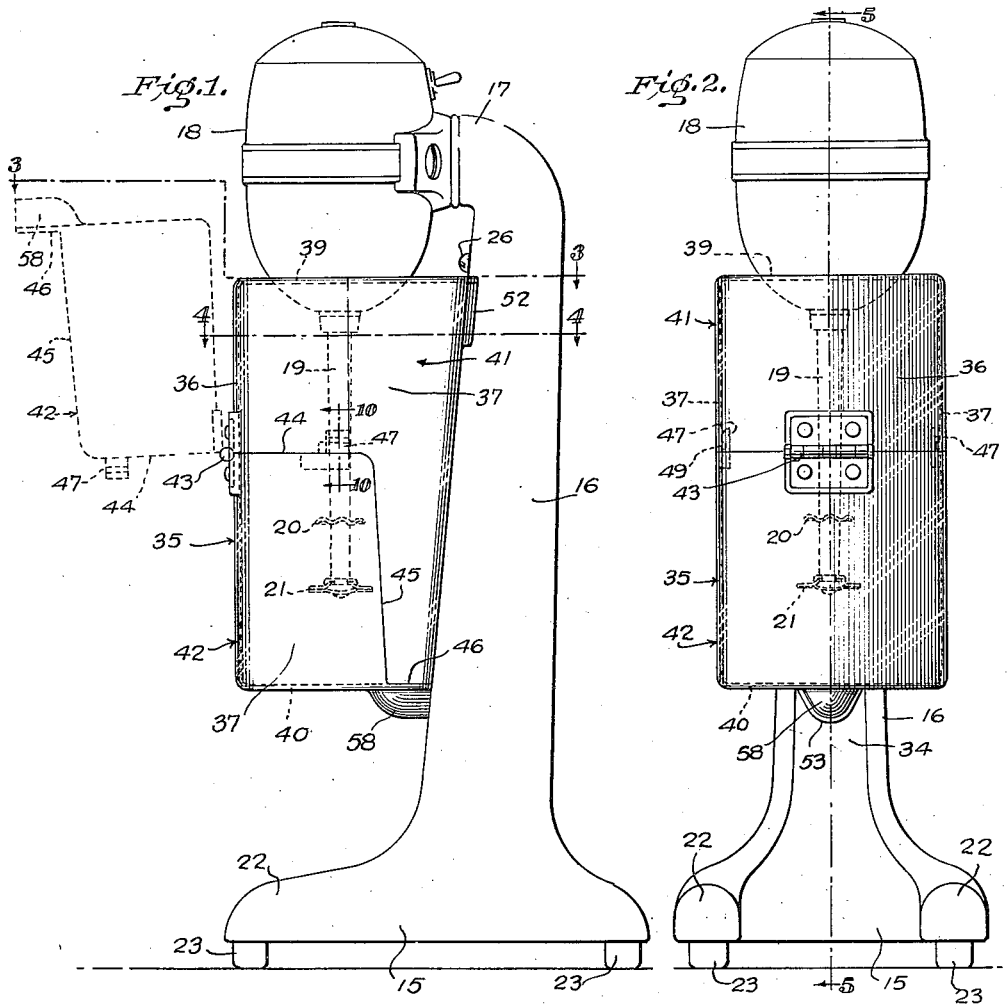
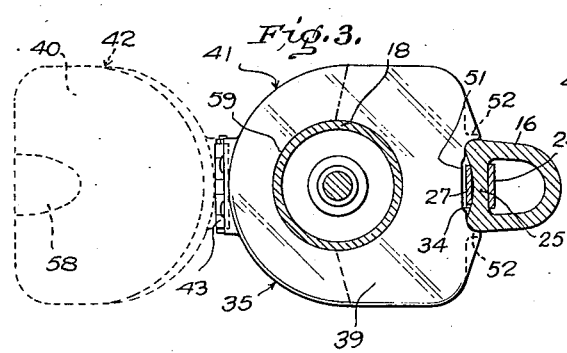
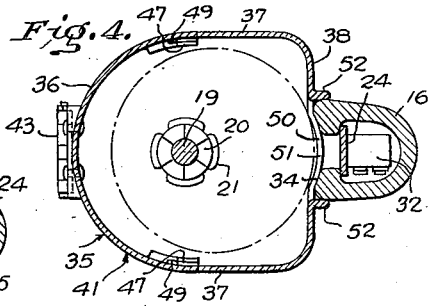
William T. Gafford
INVENTOR
BY Reginald W. Hoagland
ATTORNEY

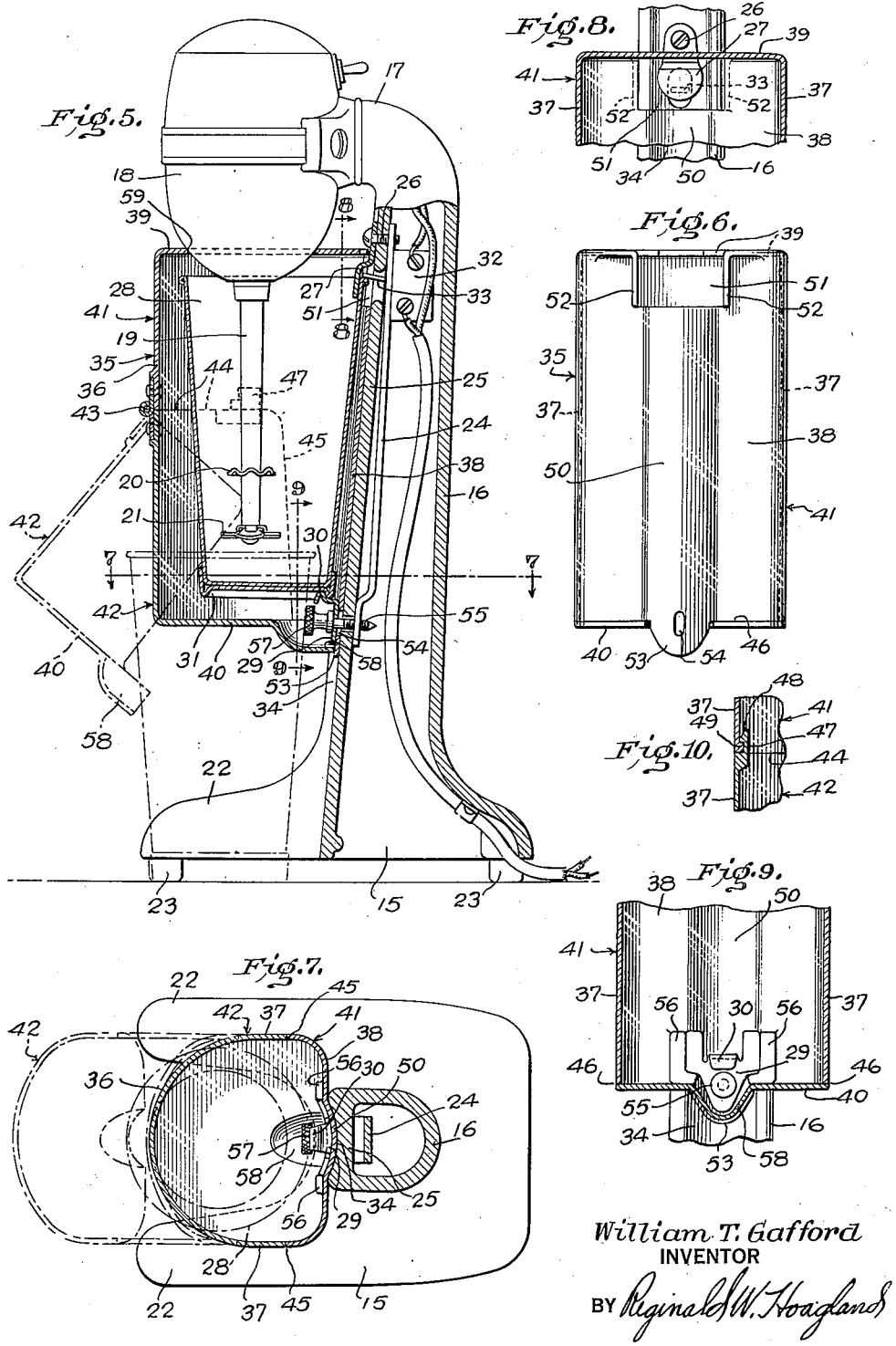

Patented Feb. 26, 1952

2,587,135

UNITED STATES PATENT OFFICE 2,587,135

PROTECTOR ATTACHMENT FOR SODA FOUNTAIN MIXERS

William T. Gafford, Flint, Mich.

Application December 21, 1950, Serial No. 201,910

8 Claims. (Cl. 259—135)

The present invention relates to new and useful improvements in protector attachments to soda fountain mixers and is a continuation-in-part application of my United States Patent application, Serial No. 131,799, filed December 8, 1949, now abandoned.

Generally speaking, during rush hours, soda fountain mixers are not cleaned between uses but instead are left unprotected and with fluids of previously mixed drinks on the agitators and agitator stems. The beverages prepared by such mixers are usually of a very sweet nature and therefore, the residue of the drinks attracts flies and other small winged insects which light on the agitators and the stems when the mixers are not in use. Such a sight is very unpleasing to customers, especially to those seated at a counter where mixers are clearly and constantly visible. Also, by exposing sticky agitators and the stems thereof to the atmosphere of a room in which people are continuously moving about, dust and other small particles of foreign matter circulating in the room cling thereto.

It is therefore an object of the invention to provide a protector for soda fountain mixers which houses the agitators and agitator stem of the mixer against foreign matter and winged insects when the mixer is idle.

Another object of the invention is to provide a protector for soda fountain mixers as outlined above which will completely enclose the mixing cup for sanitary reasons during agitation of liquids therein, which will support the mixing cup in an upright position on the surface upon which the mixer rests should the cup accidentally become dislodged from its support on the mixer during the mixing operation, and which will present a shield to prevent the agitators from splashing the contents of the cup against a wall to the rear of the mixer during placing or removal of the mixing cup on and from the machine.

A further object of the invention is the provision of a protector attachment of unique construction which is applicable to conventional soda fountain mixers in a simple and effective manner and which can be easily and conveniently removed from and replaced on the mixer for cleaning purposes.

It is also an object of the invention to provide a protector attachment for mixers of the above-indicated character which is simple and substantial in construction, economical to manufacture, and thoroughly efficient and practical in use.

Other objects will be pointed out during the description of the device shown in the accompanying drawings or will become obvious or apparent or will suggest themselves upon an inspection of the accompanying drawings and this specification.

The invention is illustrated in the accompanying drawings, wherein:

Figure 1 is a side elevation of a mixer with the improved protector thereon, showing in dotted lines a movable portion of the protector swung upwardly;

Figure 2 is a front elevation of the mixer and protector;

Figure 3 is a horizontal section on line 3—3 of Figure 1 through the mixer, showing the protector in plan elevation, and showing in dotted lines the movable portion of the protector in open position;

Figure 4 is a horizontal section taken on line 4—4 of Figure 1, showing in dash and dot lines the position of the mixing cup;

Figure 5 is a vertical section taken on line 5—5 of Figure 2, showing in dash and dot lines the movable portion of the protector aiding in supporting a mixing cup in upright position and resting on the surface on which the mixer rests;

Figure 6 is a rear elevation of the protector removed from the mixer;

Figure 7 is a horizontal section taken on line 7—7 of Figure 5, showing in dash and dot lines the positions of elements illustrated in Figure 5;

Figures 8 and 9 are fragmentary vertical sections taken on lines 8—8 and 9—9, respectively, of Figure 5; and Figure 10 is a fragmentary vertical section on line 10—10 of Figure 1.

The soda fountain mixer illustrated in the drawings may be taken as conventional or typical and embodies a base 15 from which extends upwardly and slightly rearwardly a hollow standard 16 that has attached to a forwardly projecting upper end 17 thereof a casing 18 of an electric motor. Connected to the armature of the electric motor and depending therefrom in a vertical direction is a rotatable stem 19 with agitators 20 and 21 thereon. The portion of the base 15 beneath the motor and agitating elements is forked providing a pair of forwardly projecting spaced feet 22 for supporting the overhanging weight of the motor. Under the base 15 and feet 22 thereof are secured resilient pads 23 which engage the surface upon which the mixer rests. Within the hollow standard 16 is a vertically arranged bar 24 attached at its upper end to a forward wall 25 of the standard 16 by a machine screw 26 which also attaches to the same wall but exteriorly thereof a downwardly projecting clip 27 that engages inside the rim of a mixing cup 28 when said cup is supported on the standard 16. The lower end of the bar 24 is normally attached to the wall 25 in the same manner as that previously described and, in turn, supports a bracket 29 with a lateral ledge 30 over which an annular flanged bottom 31 of the cup engages. On the upper end of the bar 24 is an electric switch 32 with a spring-returned switch-actuating finger 33 projecting through an opening in the wall 25 and in the path of movement of the rim of the cup 28 when inserted under the clip 27 for swinging said finger upwardly against tension of its spring to close a circuit to the motor when the cup 28 is supported on the standard 16. The forward surface of the wall 25 of the standard 16 is arced inwardly, as at 34, and conforms substantially to the curvature of the cylindrical wall of the mixing cup 28.

The improved protector attachment and its construction in combination with the above-described type of mixer forming the subject of the present invention consists of a thin-walled enclosure casing 35, preferably constructed of plastic or similar material, molded or otherwise formed to a size and shape for housing the agitators 20 and 21, agitator stem 19, and mixing cup 28. The casing 35 is formed with a semi-cylindrical, vertically extending front wall portion 36, vertical, opposite side walls 37, slightly angled from a vertical and relatively flat rear wall 38, and horizontal top and bottom walls 39 and 40, respectively. For permitting easy and convenient access to the interior of the casing 35, the same is made up of two sections 41 and 42 hinged together at 43 for swinging the section 42 forwardly and upwardly to an open position, as shown in dotted lines in Figures 1 and 3, while the section 41 remains stationary in an attached position on the mixer.

The lines of separation of the sections 41 and 42 extend horizontally across the semi-cylindrical front wall 36 substantially midway of its vertical length and slightly into the opposite side walls 37, as at 44, from where it extends downwardly and at a slight angle rearwardly on the side walls 37, as at 45, until it reaches the bottom wall 40 where it extends rearwardly on a horizontal plane, as at 46, leaving the entire bottom wall 40 a part of the movable section 42. The edges of the walls separated by providing the two sections 41 and 42 align and abut when the casing is in a closed position.

In order that the section 42 may remain in any position into which it is capable of being moved, the hinge 43 is of a friction type to overcome movement of said section caused by its own weight or by vibration caused by the operation of the electric motor. To further hold the section 42 in closed position, a pair of ears 47 carried on the side walls 37 of the section 42 project upwardly above the separation line 44 and have catches 48 thereon for yieldably engaging over shoulders 49 provided on the walls 37 of the section 41.

Along the vertical central portion of the slightly angled vertical rear wall 38, said wall is arced outwardly, as at 50, to the same curvature as the inwardly arced forward surface 34 of the wall 25 of the standard 16 for engagement of such surfaces with one another upon attachment of the casing 35 to the mixer. At the top of the rear wall 38 also centrally thereof and where it joins the top wall 39, a rectangular opening 51 is provided through which the clip 27 and finger 33 of the switch 32 extend, while along opposite side edges of the opening, rearwardly directed flanges 52 are provided which engage the sides of the standard 16 to prevent side movement of the casing on the standard.

Also, the central portion of the rear wall 38 is extended downwardly below the bottom wall 40 of the casing, as at 53, and is provided with an elongated opening 54 through which is extended an attaching member 55 in the form of a thumb screw which is a replacement for the usual machine screw used to hold the bracket 29 and lower end of the bar 24 attached to the wall 25 of the standard. The bracket 29, instead of being next to the wall 25, in this case is located inside of the casing 35 with the extension 53 of the rear wall 38 between same and said wall, and with the attaching member 55 extending through all of these members and threaded into the lower end of the bar 24. Lugs 56 on the interior surface of the rear wall 38 engage outer edges of the bracket 29 and form a seat for supporting said bracket in proper position.

The attaching member 55 has a forwardly spaced, knurled head 57 thereon located in advance of the ledge 30 of the bracket 29 for permitting convenient finger and thumb engagement therewith when attaching or detaching the casing and mixer. This head and the lower portion of the bracket 29 are received in and enclosed by a depression 58 in the bottom wall 40 of the casing. The rearward edge of the depression abuts or is in close proximity to the forward face of the extension 53.

For holding the upper portion of the casing 35 in proper position on the mixer with surfaces of the walls 25 and 38 in engagement, a circular opening 59 is provided in the top wall 39 of the casing through which projects the lower end of the motor casing 18 that engages with edges of the opening. Should the casing of the motor be of a different contour than that shown, as is the case with some mixers, the size and location of the opening 59 will vary, the idea being that it is the attachment of the lower end of the casing to the standard that holds the upper end of the casing up to and in engagement with the motor or a part thereof for supporting the upper portion of the casing in place.

To attach the protector to a mixer, all that is necessary after removing the mixing cup 28 is to remove the machine screw that normally holds the bracket 29 and lower end of the bar 24 to the wall 25 of the standard 16, move the casing upwardly and around the agitator stem 19 by passing said stem through the opening 59 in the top wall 39 until the edges of the opening 59 engage the motor casing 18 and the rear wall 38 of the casing 35 engages the wall 25 of the standard 16 with the clip 27 projecting through the opening 51 and with flanges 52 in contact with the standard, swing the movable section 42 of the casing 35 to an open position, place the bracket 29 in the seat provided by the lugs 56, replace the removable machine screw with the fastening member 55 by inserting said member through the bracket 29, opening 54, and opening in the wall 25, and thread until tight said fastening member into the lower end of the bar 24. The protector casing is then ready for use.

In operation, the opening provided in the casing 35 by hinging the section 42 on the section 41 is sufficient to permit insertion of the mixing cup 28 containing ingredients. When inserted, the cup fits under the clip 27 and rests on the ledge 30 of the bracket 29. The section 42 of the casing is then swung downwardly to a closed position and remains in such position during agitation of the drink. After enough time has elapsed to completely mix the drink, the section 42 is opened and the cup is removed in the usual manner. Whereupon, the section 42 is again swung to a closed position to protect the sticky agitator stem and agitators against contact with winged insects and other foreign matter which may be circulating in the vicinity of the mixer.

Should the mixing cup 28, for any reason, become dislodged from over the ledge 30 during the mixing of a drink and drop downwardly with enough force to swing the section 42 to a partially open position, as shown with dash and dot lines in Figures 5 and 7, the cup will come to rest in an upright position on the surface upon which the mixer rests and between the feet 22 of the base of the mixer with side walls of both sections 41 and 42 and bottom wall 40 of the section 42 preventing the overtipping of the cup and the spilling of its contents.

The constructional form above described and illustrated in the drawings is only to be regarded as an example, and its details may, of course, be modified in several ways without departing from the principle of the invention.

What is claimed is:

1. In combination with a soda fountain mixer including a vertical standard, a motor supported by and forwardly of said standard, an agitator driven by and extending downwardly from said motor in front of said standard, and a mixing cup supporting element detachably fixed on said standard; a protector casing comprising a stationary section, and a movable section adapted to be united with said stationary section to enclose said agitator, said stationary section having an opening therein into which a portion of the motor engages, said stationary section being attached to said standard by said detachable cup-supporting element and held relative to the agitator by said motor engagement.

2. The combination of claim 1 wherein said attachment includes the clamping of a portion of said stationary section under said detachable cup-supporting element.

3. In combination with a soda fountain mixer including a vertical standard, a motor supported by and forwardly of said standard, an agitator driven by and extending downwardly from said motor in front of said standard, an upper mixing cup supporting element on said standard, and a lower mixing cup supporting element detachably fixed on said standard; a protector casing comprising a stationary section, and a movable section adapted to be united with said stationary section to enclose said agitator, said stationary section having an opening therein into which a portion of the motor engages, said stationary section having a second opening therein through which said upper cup-supporting element extends, said stationary section being attached to said standard by said lower detachable cup-supporting element and held relative to the agitator by said motor engagement.

4. In combination with a soda fountain mixer including a vertical standard, a motor supported by and forwardly of said standard, an agitator driven by and extending downwardly from said motor in front of said standard, an upper mixing cup supporting element on said standard, and a lower mixing cup supporting element detachably fixed on said standard; a protector casing comprising a stationary section, a movable section adapted to be united with said stationary section to enclose said agitator, said stationary section having an opening therein into which a portion of the motor engages, said stationary section having a second opening therein through which said upper cup-supporting element extends, and a pair of spaced projections on said stationary section adapted to engage opposite sides of said standard, said stationary section being attached to said standard by said lower detachable cup-supporting element and held relative to the agitator by said motor engagement and by said spaced projections.

5. In combination with a soda fountain mixer including a vertical standard, a motor supported by and forwardly of said standard, and an agitator driven by and extending downwardly from said motor in front of said standard; a protector casing comprising a stationary section having a top wall and side walls integral with and substantially prependicular to said top wall providing a depending wall around said top wall, at least one of said side walls being of greater depth than the others, a movable section having a bottom wall and upstanding side walls integral with and substantially perpendicular to said bottom wall, said movable section adapted to be moved to position its side wall edges adjacent the side wall edges of the stationary section with the bottom wall of the movable section adjacent at least one of the side walls of greater depth upon uniting said movable section with said stationary section to enclose said agitator, said top wall of said stationary section having an opening therein through which said agitator is extended, and means detachably connecting a side wall of greater depth of said stationary section to said standard.

6. The combination of claim 5 wherein a hinge connection of adjacent side walls of both of said sections provides for movement of the movable section on the stationary section.

7. The combination of claim 6 wherein said hinge is of a friction type for supporting said movable section in any position into which it is capable of being moved.

8. In combination with a soda fountain mixer including a vertical standard, a motor supported by and forwardly of said standard, an agitator driven by and extending downwardly from said motor in front of said standard, and a mixing cup supporting element detachably fixed on said standard; a protector casing comprising a stationary section having a top wall and side walls integral with and substantially perpendicular to said top wall providing a depending wall around said top wall, at least one of said side walls being of greater length than the others, and a movable section having a bottom wall and upstanding side walls integral with and substantially perpendicular to said bottom wall, said movable section adapted to be moved to position its side wall edges adjacent side wall edges of the stationary section with the bottom wall of the movable section adjacent at least one of the side walls of greater length upon uniting said movable section with said stationary section to enclose said agitator, said top wall of said stationary section having an opening therein into which a portion of the motor engages, a side wall of greater depth of said stationary section being attached to said standard by said detachable cup-supporting element.

WILLIAM T. GAFFORD.

REFERENCES CITED

The following references are of record in the file of this patent:

UNITED STATES PATENTS

| Number | Name | Date |
|---|---|---|
| 1,128,699 | Lindsay | Feb. 16, 1915 |
| 1,436,172 | Holmgren et al. | Nov. 21, 1922 |
| 1,592,788 | Supervielle | July 13, 1926 |
| 2,070,776 | Bemis | Feb. 16, 1937 |
| 2,513,848 | Cox | July 4, 1950 |